June 20, 1950          K. W. HALL          2,512,205
HYDRAULIC CYLINDER VELOCITY CONTROL
Filed June 12, 1945          2 Sheets-Sheet 1
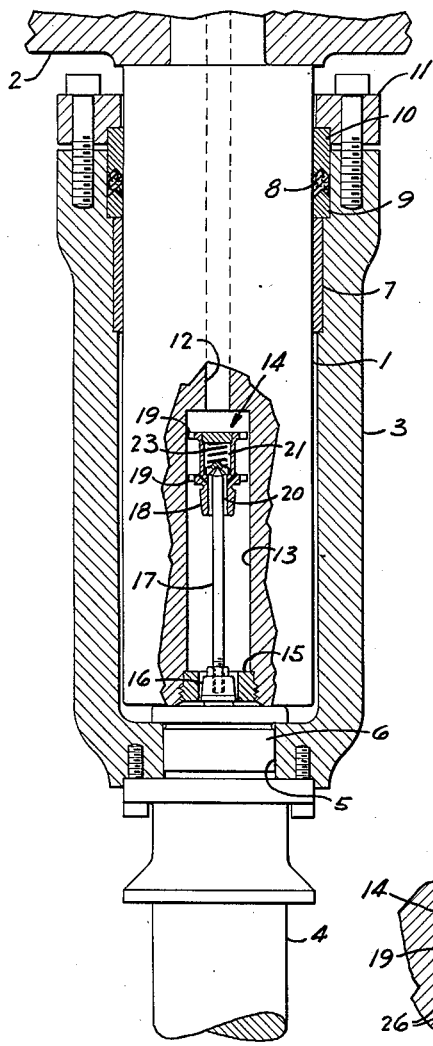
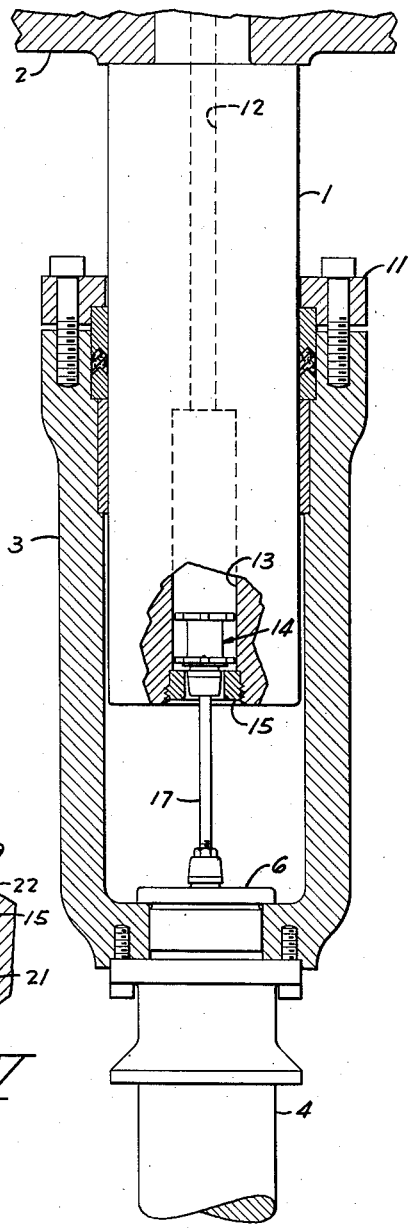
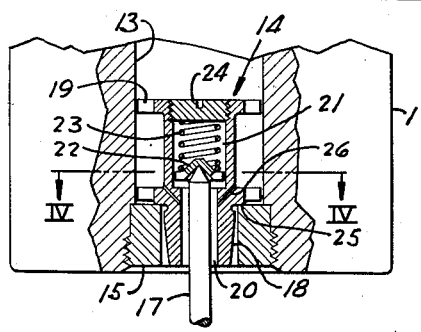
INVENTOR.
Keith W. Hall
BY
Marshall & Marshall
ATTORNEYS June 20, 1950 K. W. HALL 2,512,205
HYDRAULIC CYLINDER VELOCITY CONTROL
Filed June 12, 1945 2 Sheets-Sheet 2
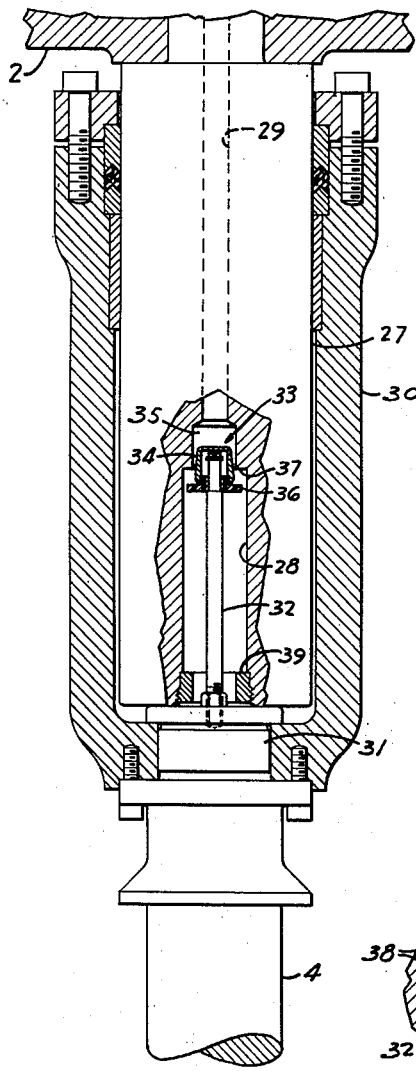
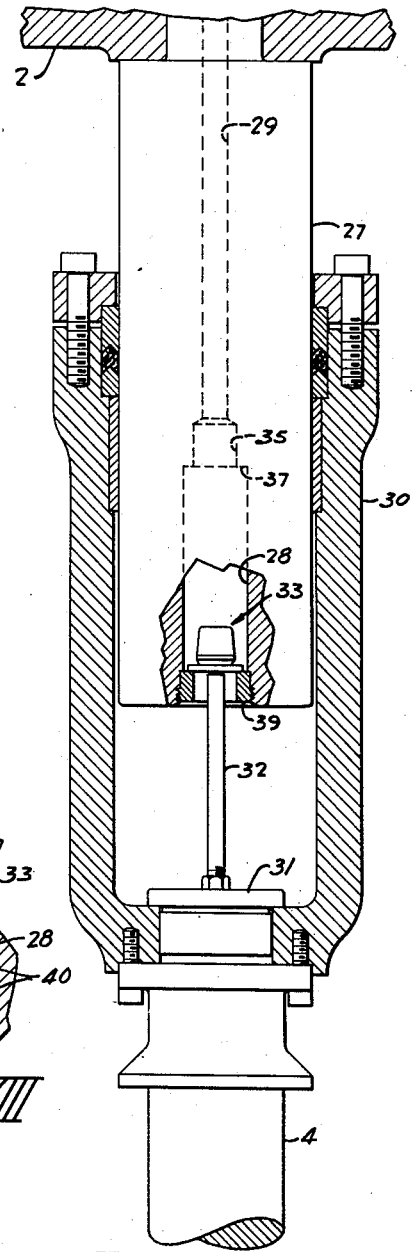
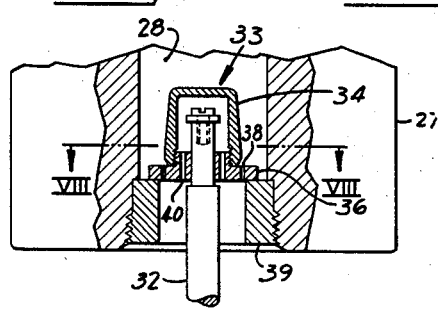
INVENTOR.
Keith W. Hall
BY
Marshall & Marshall
ATTORNEYS Patented June 20, 1950

2,512,205

UNITED STATES PATENT OFFICE 2,512,205

HYDRAULIC CYLINDER VELOCITY CONTROL

Keith W. Hall, Toledo, Ohio, assignor, by mesne assignments, to The Baldwin Locomotive Works, a corporation of Pennsylvania Application June 12, 1945, Serial No. 599,098

10 Claims. (Cl. 121—38)

This invention relates to controls for a hydraulic press and in particular to mechanism for limiting the velocity of the moving part of the press when it near the limits of its travel.

In the art of transfer molding and similar processes hydraulic presses are used to secure the high forces required for the molding process. The materials being molded often impose an additional requirement that the press operate at high speed. When a hydraulic press is designed for high speed operation care must be exercised so that accidental damage cannot occur when the press is operated without a load.

The object of the present invention is to provide a simple mechanism which while permitting high speed operation during the major portion of the press stroke limits the velocity of the press to a safe value as the press approaches the limits of its travel.

Another object of the invention is to provide resilient means such that a valve body used to limit the press velocity at the limits of its stroke may operate sooner if the press is moving at high velocity.

Another object of the invention is to provide means for relaying the movement of a press cylinder during the start of a pressing operation.

These and other objects and advantages are attained in the examples of the invention illustrated in the accompanying drawings.

According to the invention a cylindrical bore or passage is provided in the stationary member of a hydraulically actuated piston and cylinder, the passage serving to admit hydraulic fluid to the cylinder to produce movement thereof. The cylinder end of the passage is bored out to receive a slidably mounted valve body which is used to regulate or throttle the flow of fluid through the passage and which is retained in the enlarged part of the passage by an orifice ring threaded into the end of the bored out portion. A slender stem or pin mounted in the moving part of the piston cylinder combination extends through the orifice ring and contacts the valve body. The orifice ring has a sufficiently large internal diameter that, even with the stem inserted therethrough, it does not materially restrict the flow of hydraulic fluid. The stem is, however, enlarged at its base so that when the enlarged portion enters the orifice ring it throttles the flow of fluid. The valve body, slidably mounted in the passage, similarly throttles the flow at the other end of the stroke when the stem lowers the valve body into cooperation with the orifice ring. This simple structure thus provides positive means for regulating the velocity of a press cylinder by throttling the flow of hydraulic fluid as the press cylinder approaches either end of its stroke.

In the examples selected to illustrate the invention the piston is the stationary member of the piston-cylinder combination and the valve arrangement is built into the interior of the piston. This construction is shown in the accompanying drawings.

In the drawings:

Figure I is a fragmentary vertical elevation largely in section, showing a hydraulically actuated piston and cylinder incorporating the improved velocity control.

Figure II is similar to Figure I except the cylinder is shown in extended position.

Figure III is an enlarged fragmentary view of the velocity controlling valve.

Figure IV is a fragmentary horizontal section taken substantially along the line IV—IV of Figure III.

Figures V, VI, VII and VIII are views similar to views I, II, III and IV respectively, showing a different form of velocity controlling valve.

These specific figures and the accompanying description are merely illustrative of the invention and are not intended to impose limitations on the claims.

In the examples selected to illustrate the invention a long cylindrical piston 1 projects downwardly from a fixed portion 2 of the frame of a press or similar structure. A cylinder 3 is slidably mounted on the piston 1 and has a ram 4 bolted to its lower end. The ram 4 is adapted to transmit the force exerted by the cylinder 3 to the work. The ram 4 is guided in suitable bearings, not shown, so that the cylinder 3 cannot get out of alignment with the piston 1. As manufactured the cylinder 3 has a hole 5 at its normally closed end to permit a boring bar to be inserted through the cylinder 3 thus simplying machining operations. A fitted plug 6 seals the opening 5 to prevent any loss of hydraulic fluid at that point. The open end of the cylinder 3 is provided with a bearing 7 for guiding the cylinder 3 on the piston 1 and a packing ring 8 for preventing the loss of hydraulic fluid past the piston 1. The packing ring 8 of V-shaped cross-section is interposed between a spreading ring 9 and a compressing ring 10. The bearing 7 and the packing ring 8 are secured in position by a clamping ring 11 suitably bolted to the end of the cylinder 3.

Hydraulic fluid for operating the cylinder is admitted through a hole 12 drilled axially through the piston 1. The end of the hole 12 in the lower end of the piston 1 is enlarged to provide a valve chamber 13 in which a valve 14 is slidably mounted. The valve body 14 is retained in the valve chamber 13 by an annular ring 15 threaded into the end of the valve chamber.

The upper surface of the plug 6, fitted in the bottom of the cylinder 3, has an upwardly projecting stopper 16 adapted to enter and nearly stop the flow of fluid through the orifice in the valve retaining ring 15. To secure smooth deceleration when the flow of fluid through the passage 12 is throttled by the stopper 16 the sides of the stopper are tapered so as to produce an annular variable area orifice whose width decreases as the stopper 16 enters the retaining ring 15. The stopper 16 thus serves to cushion the upper end of the stroke of the cylinder 3 by restricting the flow of hydraulic fluid from the cylinder and also tends to provide a time delay between the application of hydraulic pressure and the downward movement of the cylinder 3. The time delay results from the time required for hydraulic fluid to pass through the narrow annular orifice and fill the space in the cylinder 3 below the piston 1.

The valve body 14 is supported on the upper end of a stem 17 projecting upwardly from the stopper 16. As the cylinder 3 moves downwardly under the influence of the inward flow of hydraulic fluid, the valve body 14 is lowered through the valve chamber 13 until its tapered lower end 18 enters the hole through the valve retaining ring 15. Until the conical end 18 reaches the retaining ring 15 hydraulic fluid is allowed to freely flow past the valve body 14 and into the cylinder, the valve body 14 being provided with projecting guides 19 holding it central in the valve chamber 13. Also the valve body is drilled axailly to provide a small diameter hole 20 through the conical portion 18 and a larger hole 21 in the valve body proper. A spring seat 22 resiliently retained against a shoulder formed at the junction of the holes 20 and 21 by a spring 23, by resting on the upper end of the stem 17 supports the valve body in the chamber. When the cylinder 3 is moving downward at normal velocity the spring 23, held compressed by a retaining plug 24, supports the weight of the valve body 14 as well as the drag resulting from the flow of hydraulic fluid past it. When the conical end of the valve body enters the retaining ring the drag of the flow of hydraulic fluid past the valve body increases and if the rate of movement be high enough the spring 23 is further compressed (as is shown in Figure III) to permit the valve body to be sucked down until a sealing surface 25 seats on the upper edge of the valve retainer 15. When the valve body so seats under the influence of high velocity fluid the flow into the cylinder is cut off except for that flowing through a series of small holes 26 drilled in the valve body so that driving force to the hydraulic cylinder is virtually cut off and the cylinder must therefore move at comparatively slow speed.

In case the velocity of the press cylinder 3 is low the flow of fluid coming into the cylinder is also low and the drag on the valve body 14 is insufficient to compress the spring 23 and therefore the valve body does not materially throttle the flow of fluid until the end of the working stroke is reached and the mechanical limits of movement are approached.

Thus this simple structure provides protection for preventing the cylinder from rapidly striking stops at either end of its stroke as well as a small time delay at the start of the stroke.

In the second example shown in Figures V, VI, VII and VIII the valve body is of different shape and the valve chamber is varied accordingly. In this second example a piston 27 is provided with a valve chamber 28 and an axial passage 29 for admitting hydraulic fluid to the valve chamber 28 and thence to the space beneath the piston 27 and within a cylinder 30 slidably mounted on the piston 27. The cylinder 30 is similar to the cylinder 3 in all respects except that a plug 31 equivalent to the plug 6 used to close the end of the cylinder does not have a stopper formed in its upper surface. In contrast a stem 32 is threaded into a tapped hole in the upper surface of the plug 31 and extends upwardly into the valve chamber 28. A valve body 33 is slidably mounted on the top end of the stem 32. When the cylinder 30 approaches its upper limit of travel a tapered upper part 34 of the valve member 33 enters a reduced diameter portion 35 of the valve chamber 28. If the cylinder is moving at high velocity during its upward stroke, such that the fluid is flowing rapidly through the valve chamber 28 and the axial passage 29, the valve body 33 will be sucked up into the reduced diameter chamber 35 until its disk-like portion 36 seats on a shoulder 37 formed at the start of the small diameter chamber 35. When this occurs the flow of hydraulic fluid through the chamber 28 and the passage 29 is restricted to that small amount which can flow through orifices 38 in the disk-like portion 36 of the valve 33. The small flow through this restriction permits the cylinder to slowly approach its upper limit of travel and ensures that no damage can result to the cylinder through faulty operation of the manual controls.

When the cylinder 30 approaches the other end of its stroke, the position shown in Figures VI and VII, the stem 32 lowers the valve body 33 until the disk-like portion 36 seats on the upper edge of a valve retaining orifice ring 39. The internal diameter of the orifice ring 39 is large enough to permit fluid flow through the orifices 38 when the valve body is seated on the orifice ring 39.

The valve body 33 is fashioned so that its tapered upper portion 34 completely surrounds the upper end of the stem 32. This is done to prevent the high pressure fluid from acting on the end of the stem 32 and thus providing a driving force to the cylinder 30 even after the valve body 33 has seated itself on the orifice ring 39. Additional orifices 40 leading from the space beneath the valve body 33 into the interior of the hollow tapered portion 34 allow relative motion between the stem 32 and the valve body which would otherwise be restricted by pumping action of the end of the stem 32.

The valve body of the second example is somewhat cheaper and easier to manufacture but suffers from the disadvantage that it is unable to anticipate the end of the stroke when the cylinder is moving at high velocity. The valve body of the first example is capable of such anticipation because of the spring 23 resiliently supporting it from the stem 17. The valve body of the second example, however, is capable of anticipating or sensing abnormally high velocities as the upper end of the stroke is approached.

In each of these examples the piston is shown to be the stationary member. The field of usefulness of the invention however is not so limited because the novel form of velocity control would be equally efficient and operable regardless of whether it is mounted in the end of a stationary piston or in a valve chamber and passage located in the normally closed end of a stationary cylinder.

The invention thus provides a simple, easily manufactured mechanism for efficiently safe guarding a hydraulically actuated piston and cylinder from damage due to faulty operation of the manual controls. The advantages of the invention may be attained when the functions of the piston and cylinder are reversed, i. e. the cylinder is attached to the rigid member of the press frame and the piston acts against the work in which case the valve chamber would be located within an extension of the cylinder leading to the hydraulic pressure line.

Having described the invention, I claim:

1. In a device of the class described, in combination a hydraulically actuated piston and cylinder for exerting force in a press or similar structure, said piston having an axial passage therethrough for supplying fluid to said cylinder, said passage having a restricted opening, a stem set in the cylinder and extending into the passage, and a valve body located in said passage and movable with respect to said stem which in part determines its movement in the passage.

2. In a device of the class described, in combination, a hydraulically operated mechanism for exerting force in a press or similar device, said mechanism comprising a piston member and a cylinder member, one of said members having an axial passage for admitting fluid to operate said mechanism, a valve body loosely positioned in said passage, and means on the other of said members for actuating said valve body to throttle the flow of fluid through said passage when said piston and cylinder members approach the limits of their relative movement.

3. In a device of the class described, in combination, a relatively movable piston and cylinder, said piston having a passage therethrough for admitting fluid to said cylinder, an orifice ring fitted in the end of the passage, a movable valve body enclosed in the passage above said ring, and a stem in said cylinder that loosely engages the valve body for actuating said valve body.

4. In a device of the class described, in combination, a relatively movable piston and cylinder, said piston having a passage therethrough for admitting fluid to said cylinder, said passage having portions of different diameters, and a tapered plug adapted to cooperate with the portions of different diameters and actuated jointly by the cylinder and the fluid to throttle the flow of fluid through said passage during predetermined portions of the stroke of the cylinder on the piston.

5. In a device of the class described, in combination, a relatively movable piston and cylinder, said piston having a passage therethrough for admitting fluid to said cylinder, a valve body slidably mounted in said passage, an orifice ring at the end of said passage for retaining said body and cooperating with the body to throttle fluid flow, a member fixed in said cylinder for moving said valve body, and resilient means in said valve body for permitting said body to respond to high velocity fluid flow and advance the point at which throttling occurs near the end of the stroke of said cylinder on said piston.

6. In a device of the class described, in combination, a relatively movable piston and cylinder, said piston having a passage therethrough for admitting fluid to said cylinder, a valve body slidably mounted in said passage, an orifice ring for retaining said valve body in said passage, means in said cylinder projecting through said orifice ring for actuating said valve body, resilient means permitting said valve body to respond to high velocity fluid flow, and a plug secured in said cylinder adapted to cooperate with said orifice ring, said valve and said ring serving to throttle flow at one end of the stroke of said cylinder, said plug and said ring serving to throttle flow at the other end of the stroke of said cylinder.

7. In a device of the class described, in combination, a piston and cylinder constituting relatively movable elements, one of said elements containing a valve chamber through which hydraulic fluid for actuating said elements is passed, a valve body that is contained within the valve chamber and that engages an end of the chamber for controlling the flow of fluid through the chamber, and a stem extending from the other of said elements for unseating the valve body except when said elements are near their fully extended limit of movement.

8. In a device of the class described, in combination, a piston and cylinder constituting relatively movable elements, one of said elements containing a valve chamber through which hydraulic fluid for actuating said elements is passed, a valve body contained within the chamber for controlling the flow of fluid therethrough, a valve seat in the end of the chamber with which the valve body cooperates to limit flow into the cylinder, and a stem rigidly secured to an extending from the other element for actuating the valve body, said stem depositing the valve body on the valve seat as the elements approach their limit of separation whereby the valve body relieves the stem of all load as the limit of separation of the elements is approached.

9. In a device of the class described, in combination, a piston and cylinder constituting relatively movable elements, one of said elements containing a valve chamber through which hydraulic fluid for actuating said elements is passed, a valve body contained within the chamber for controlling the flow of fluid therethrough, a valve seat in the end of the chamber with which the valve body cooperates to limit flow of fluid, and a stem extending from the other element for actuating the valve body, and a resilient member connecting the stem and valve body to permit the valve body to respond to high rates of flow and advance the point of control accordingly.

10. In a device of the class described, in combination, a piston and cylinder constituting relatively movable elements, one of said elements containing a valve chamber through which hydraulic fluid for actuating said elements is passed, a valve body contained within the chamber for controlling the flow of fluid therethrough, said valve chamber having a reduced diameter portion near an end, said valve body having a yieldable portion and a tapered portion that may enter the reduced diameter portion of the valve chamber, and a stem extending from the other of said elements and loosely engaging the yieldable portion of the valve body, whereby the valve body is moved through the valve chamber upon relative movement of said elements and is permitted to move relative to the stem under the impetus of high velocity fluid as its tapered portion enters the reduced diameter portion of the chamber.

KEITH W. HALL.

REFERENCES CITED

The following references are of record in the file of this patent:

UNITED STATES PATENTS

| Number | Name | Date |
|---|---|---|
| 401,795 | Schumacher | Apr. 23, 1889 |
| 635,848 | Dutton | Oct. 31, 1899 |
| 881,165 | Taylor | Mar. 10, 1908 |
| 917,642 | McElroy | Apr. 6, 1909 |
| 1,877,102 | Whitesell | Sept. 13, 1932 |
| 1,891,312 | Knecht | Dec. 20, 1932 |
| 2,266,415 | Dinzl | Dec. 16, 1941 |
| 2,270,767 | Platz | Jan. 20, 1942 |

Certificate of Correction

Patent No. 2,512,205 June 20, 1950

KEITH W. HALL

It is hereby certified that errors appear in the printed specification of the above numbered patent requiring correction as follows:

Column 1, line 4, for the word "near" read *nears*; line 26, for "relaying" read *delaying*; column 2, line 46, for "simplying" read *simplifying*; column 5, line 29, after the syllable "bination" insert a comma; column 6, line 45, for "an" read *and*;

and that the said Letters Patent should be read with these corrections therein that the same may conform to the record of the case in the Patent Office.

Signed and sealed this 12th day of September, A. D. 1950.

[SEAL]

THOMAS F. MURPHY,
*Assistant Commissioner of Patents.*